W. COOPER.
APPARATUS FOR INTERRUPTING ELECTRIC CIRCUITS.
APPLICATION FILED FEB. 23, 1912.
1,184,826.
Patented May 30, 1916.
2 SHEETS—SHEET 1.
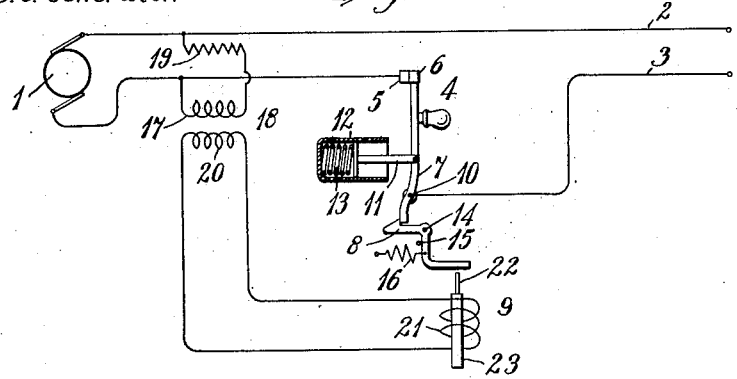
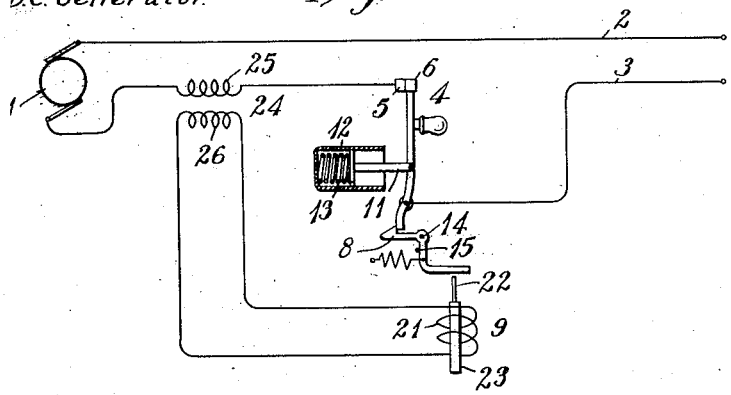
WITNESSES:
Fred H. Miller
INVENTOR
William Cooper
BY
Ashley G. Carr
ATTORNEY W. COOPER.
APPARATUS FOR INTERRUPTING ELECTRIC CIRCUITS.
APPLICATION FILED FEB. 23, 1912.
1,184,826.
Patented May 30, 1916.
2 SHEETS—SHEET 2.
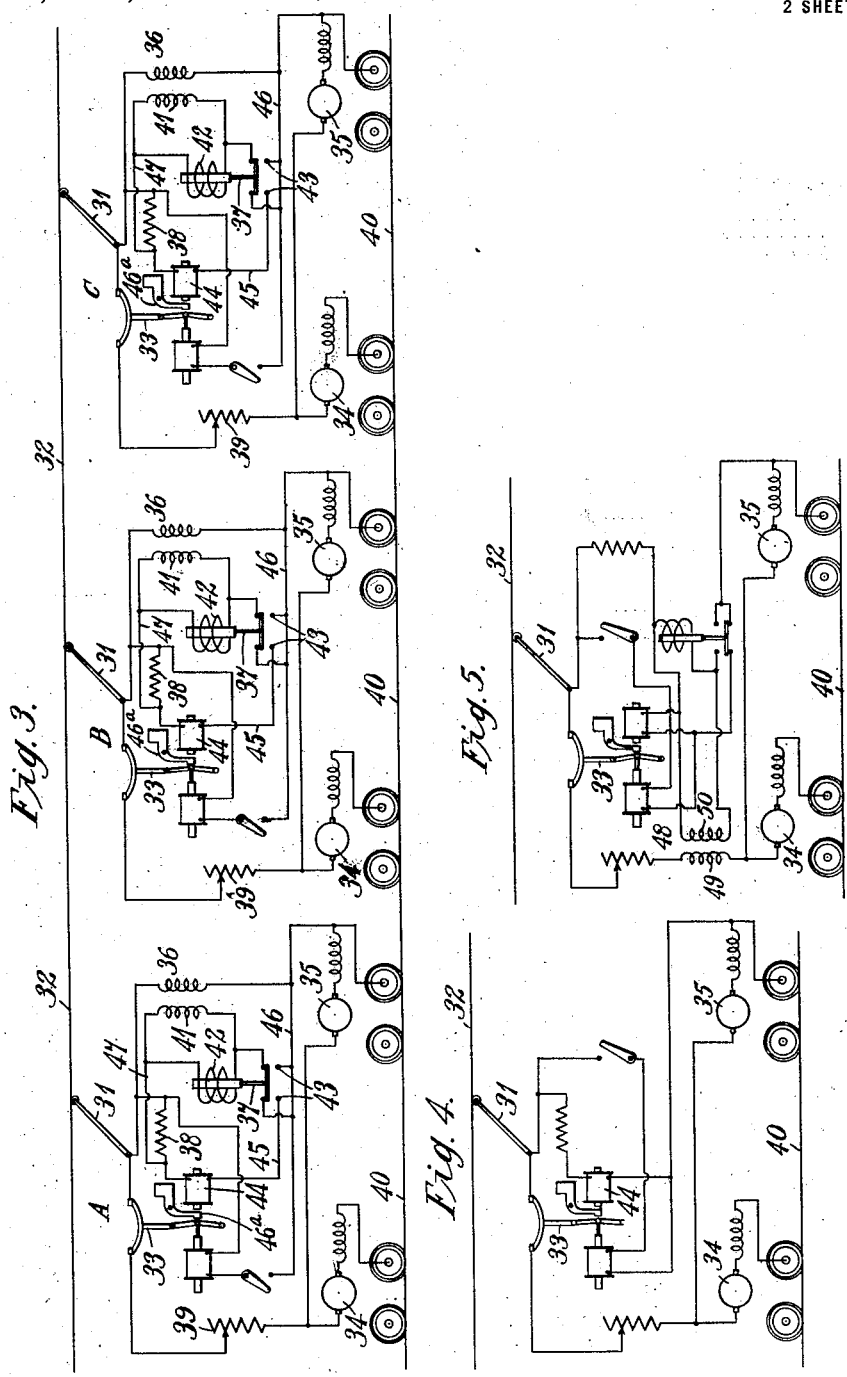

UNITED STATES PATENT OFFICE.

WILLIAM COOPER, OF PITTSBURGH, PENNSYLVANIA, ASSIGNOR TO WESTINGHOUSE ELECTRIC AND MANUFACTURING COMPANY, A CORPORATION OF PENNSYLVANIA.

APPARATUS FOR INTERRUPTING ELECTRIC CIRCUITS.

1,184,826.   Specification of Letters Patent.   Patented May 30, 1916.

Application filed February 23, 1912. Serial No. 679,297.

*To all whom it may concern:*

Be it known that I, WILLIAM COOPER, a citizen of the United States, and a resident of Pittsburgh, in the county of Allegheny and State of Pennsylvania, have invented a new and useful Improvement in Apparatus for Interrupting Electric Circuits, of which the following is a specification.

My invention relates to means for effecting the interruption of electric circuits and to systems of electric current distribution and control embodying such means.

One object of my invention is to provide an automatic circuit interrupter, which shall act in anticipation of current disturbances on the circuit with which it is associated to interrupt the circuit before the current has sufficient time to attain a dangerous or destructive value.

Another object of my invention is to adapt a circuit interrupter, of the character above specified, to prevent the flashing over of railway motors and other dynamo-electric machines of the commutator type.

Another object of my invention is to provide a system of electric motor control with means, the operation of which is dependent upon the flashing over of one of the motors of a train of electrically propelled vehicles and serves to prevent the flashing over of the other train motors.

Overloads on electric generating apparatus amounting to several times normal full load current are usually designated as short circuits. The ultimate value of the current in a short circuit and the time required to reach that value are determined by the characteristics of the circuit.

In practice, all electric circuits include inductance and, therefore, a certain time is always required for the current to reach a maximum value.

A circuit interrupter, as heretofore constructed, has usually been provided with a tripping mechanism which was dependent upon a predetermined abnormal current in the circuit and, consequently, it was practically impossible to interrupt the circuit before the current increased to a dangerous value.

According to my present invention, I provide a circuit interrupter which depends, not upon an increase or a change of the current or of the voltage in a circuit to a predetermined value, but upon the rate of change of one or both of these elements.

When the resistance in the working circuit of a direct-current generator is suddenly reduced to a relatively small value, there is an instantaneous readjustment of the generated E. M. F. through the circuit in direct proportion to the inductance of the different parts of the circuit. This division of the E. M. F. is produced by a small instantaneous increase in current. For example; if it is assumed that a generator is short circuited through an impedance having the same resistance and inductance as the armature circuit of the generator, the generated E. M. F. will divide equally between the generator armature and the short circuit impedance. In other words, the voltage at the terminals of the generator will drop to one-half its former value. At the same time, there will be an increase of current in the circuit. The drop in voltage at the generator terminals takes place in so short a time that it cannot be recorded by an oscillograph and the increase in current is so small that it cannot be read on an oscillograph record. Consequently, these changes are considered to be instantaneous.

If a short circuit on the generator terminals has practically no impedance, the voltage will, of course, drop to zero. Under these conditions also, the drop will be practically instantaneous and the instantaneous increase in current will be very small.

I utilize the aforesaid instantaneous change in either the voltage or the current in a circuit to actuate a circuit interrupter and to open the circuit before sufficient time has elapsed for the current that results from the instantaneous change in voltage to reach a dangerous or destructive value.

Figure 1 of the accompanying drawings is a diagrammatic view of an electrical distributing system embodying my invention, and Fig. 2 is a similar view of a modified arrangement which also embodies my invention. Fig. 3 is a diagrammatic view of a series of control systems representing a plurality of electric motor-driven cars or other railway vehicles which are operated in a train and illustrating the specific application of my invention to the protection of electric vehicle motors. Figs. 4 and 5 correspond to individual sections of Fig. 3 and illustrate modified circuit arrangements embodying my invention.

Referring to Fig. 1, energy is supplied from a direct current generator 1, which may be replaced by some other suitable source of energy, to distributing circuit conductors 2 and 3 through a circuit interrupter 4.

The circuit interrupter 4 comprises a stationary contact member 5, a coöperating movable contact member 6, an arm or lever 7, a latch 8, and a tripping magnet 9. The arm or lever 7 is pivotally supported, at an intermediate point in its length, on a pin 10 and carries the contact member 6 at its upper end.

A plunger 11 is pivotally connected to the arm or lever 7 and acts in a cylinder or box 12 to compress a helical spring 13 when the circuit interrupter is closed.

The latch 8 is pivotally mounted on a pin 14 and is held against a stop 15 by means of a spring 16. It is adapted to engage the lower end of the arm or lever 7 and to hold the contact members 5 and 6 in engagement, in opposition to the spring 13, when the interrupter is closed.

The primary winding 17 of a transformer 18 is connected across the terminals of the generator 1 in series with a resistor 19, and the secondary winding 20 of the same transformer, is connected to the terminals of a coil 21, which forms a part of the tripping magnet 9.

The operation of the system is as follows: Assuming that the circuit interrupter is closed, as shown in Fig. 1, it will evidently remain closed until the latch 8 is either manually actuated or is tripped by a hammer projection 22 of the movable core member 23 of magnet 9. By reason of the fact that the transformer winding 17 is connected across the terminals of a source of direct current energy, the secondary winding 20 and the coil 21 will not be energized except when a relatively rapid change in voltage occurs at said terminals. The fact that the voltage is high or low or is varying has little or no effect on the coil 21 unless the variation occurs very rapidly and, consequently, the circuit interrupter will remain closed under all ordinary conditions of operation. If, however, a low-resistance connection, such as is ordinarily designated as a short circuit, is established across the distributing circuit conductors 2 and 3, the first effect, as hereinbefore pointed out, is to produce a practically instantaneous decrease in voltage at the generator terminals. Under ordinary conditions, this change of voltage is immediately followed by a very large increase in current, which is likely to injure the generator. With the arrangement illustrated, however, the coil 21 is so energized by reason of the instantaneous change in voltage as to actuate the latch 8 and permit the spring 13 to separate the contact members 5 and 6 with great rapidity. By this means, I am able to interrupt the circuit before the increasing current in the distributing circuit attains a dangerous or destructive value.

Referring to Fig. 2, in which corresponding parts are designated by the same reference characters as in Fig. 1, a transformer 24, which is substituted for the transformer 18, comprises a primary winding 25 connected in series with the distributing circuit of the generator 1, adjacent to one of the generator terminals and a secondary winding 26 connected to the coil 21 of tripping magnet 9.

The operation of the system shown in Fig. 2 is similar to that of Fig. 1, except that the transformer winding 26 and the trip coil 21 are energized only when a very sudden change in current occurs in the distributing circuit instead of depending on a sudden change in the voltage across the generator terminals.

As hereinbefore stated, the practically instantaneous reduction in voltage produced by a low-resistance connection or short circuit is accompanied by an equally sudden increase in current. Both changes occur in such a short interval that they are considered to be instantaneous and concurrent. It is an appreciable time later that the current in the distributing circuit increases to a destructive value and, consequently, the circuit interrupter has time to open the circuit before such a value is reached.

During the operation of dynamo-electric machines a very serious arc is sometimes established over the surface of the commutator bars between two groups of brushes of opposite polarity. This phenomenon is usually known as a "flash over" and it has been attributed to various causes. It is most likely to occur on railway motors when the tracks are covered with snow and sleet.

When a motor of a train of electric cars "flashes over," the line voltage is suddenly reduced, and the current in the motor circuit is very suddenly reversed and then frequently attains a high value in the reverse direction. The fuses, which are usually located in the motor circuit are consequently blown when the circuit is being traversed by a relatively large current. An interruption of the circuit under these conditions causes the line voltage to rise very rapidly from a value considerably below to a value considerably above normal. A change of this character in the line voltage of a railway supply circuit produces a correspondingly sudden change in the voltage applied to other motors of the train on which the "flash over" occurred and to those of other trains or cars in the zone affected by the line disturbance.

The motors subjected to the aforesaid voltage increase are very liable to "flash over" and, in some cases, the line fuses on every car of a train have, in this way, been ruptured at one time.

When a dynamo-electric machine "flashes over," a low-resistance path or a short circuit is produced and considerable damage may be done before the fuses can interrupt the circuit. Even if no damage results, the delay and annoyance of replacing the fuses is considerable.

By means of my invention, it is possible to interrupt the circuit in a very short interval of time after the first instantaneous variation in voltage or current is produced by the disturbance and thus avoid the above mentioned difficulties.

An arrangement for applying my invention to railway vehicles is illustrated in Fig. 3, to which reference may now be had. Each of the sections here shown comprises a trolley or other moving contact member 31 which is adapted to engage a common supply circuit conductor 32, a line switch or main circuit interrupter 33, electric driving motors 34 and 35, a transformer 36, a relay switch 37 and a resistor 38.

The electric driving motors 34 and 35 may be governed by any well known hand-operated or automatic controller, but, since apparatus of this character forms no part of my present invention, I have shown a simple adjustable resistor 39. The supply circuit conductor 32 is connected to any suitable source of direct current energy (not shown), the circuit being completed through a track rail or other return circuit conductor 40.

The primary winding of the transformer 36 is connected directly across the circuit 32—40 and its secondary winding 41 is connected to the terminals of a magnet winding 42 of the relay switch 37. Inasmuch as the primary winding of the transformer is connected across a direct current circuit, no energy will be supplied from the secondary winding 41 of the transformer to the coil 42 except when such a sudden variation in the voltage of the supply circuit as that produced by a "flash over," occurs.

Under normal operating conditions, the relay switch 37 is, consequently, deënergized and occupies its lower position in which it bridges a pair of contact members 43 and completes a circuit from the trolley 31 through resistor 38, a magnet winding 44, a conductor 45, the switch 37 and a conductor 46 to the opposite line conductor 40. The coil 44, when energized, restrains a hammer 46ª which is adapted, when released, to forcibly open the line switch 33. Consequently, the line switch will be opened whenever the line circuit is temporarily interrupted or its voltage very materially reduced.

The operation of the system is as follows: Assuming that the motor 34 "flashes over," a very sudden diminution in the line voltage occurs which energizes the secondary winding 41 of the transformer 36 and raises the switch 37 by reason of the fact that current is supplied to the coil 42. When switch 37 is raised, a holding circuit is completed from trolley 31, through resistor 38, a conductor 47, coil 42, switch 37 and conductor 46 to the line conductor 40 and the switch is accordingly held in this position, irrespective of the subsequent deënergization of the transformer 36. The circuit through the coil 44 is interrupted to permit the hammer 46ª to open the line switch immediately after the switch 37 is raised. The line circuit disturbance is felt equally on each of the cars A, B and C, by reason of their proximity and, consequently, the line switches 33 of the cars B and C are opened, as well as the line switch 33 of the car A.

From the foregoing, it is evident that the line switches on all cars of the train are opened substantially together, although there is no mechanical or electrical interlocking connection between them. If a short circuit, or other disturbance, which effects an instantaneous adjustment of the line voltage, is produced, the circuit interrupters will be actuated and a "flash over" on any of the motors be prevented. If, however, a "flash over" is produced as the result of other causes, by the use of my invention the current traversing the arc will not reach a dangerous value before the circuit is interrupted and other "flash overs" which would usually result are prevented.

As shown in Fig. 4 of the drawings, a low-voltage release mechanism, corresponding to that described in connection with line switch 33 of Fig. 3, may alone be relied upon to interrupt the line switches whenever a "flash over" occurs on one of the motors by reason of the very material diminution in the line voltage which is produced by the "flash over", but I prefer to depend on the rate of change of electromotive force rather than on the extent of change, since the extent to which the line voltage is varied will differ according as the car or train is close to or is remote from a feeder tap or other source of supply. For example: I have found that when the cars are near a sub-station which supplies energy to the line, the line voltage disturbance produced by a "flash over" does not always exceed the fluctuations in voltage occurring in service and resulting from other causes; but, in every case, the change in voltage produced by a "flash over" on a motor is very rapid, while normal fluctuations are comparatively slow. The principal disadvantage in the use of the system of Fig. 4 arises from the fact that the current supplied to the first "flash over" may become destructive before the circuit is interrupted. It is, however, effective in preventing other "flash overs" from being produced as a result of the first. Assuming that the voltage on the line conductor 32 of Fig. 4 falls below a predetermined value, the coil 44 of the interrupter 33 will be so weakened as to release the hammer 46 and cause the interruption of the circuit.

In Fig. 5, a transformer 48 is substituted for the transformer 36 of Fig. 1. The primary winding 49 of transformer 48 is connected in series with the motor supply circuit and, consequently, its secondary winding is energized only when there is a rapid fluctuation in the current in the motor circuit, such as results from a "flash over" on the motor, as hereinbefore pointed out.

The operation of the system of Fig. 5 is the same as that of car A, Fig. 3.

I believe that my invention is broadly new and produces results not heretofore secured, and I therefore desire to cover, not only the specific arrangements shown and described, but all others that may be devised for producing substantially the same result by equivalent means.

I claim as my invention:

1. An interrupter for electric circuits comprising relatively movable contact members and means dependent upon a predetermined relatively quick rate of electrical change in the circuit for separating the contact members.

2. The combination with a direct current electric circuit, a source of energy therefor and an interrupter for the circuit, of means dependent upon a predetermined relatively quick rate of electrical change in the circuit for actuating the interrupter.

3. An interrupter for electric circuits comprising means dependent upon a predetermined relatively quick rate of change in the circuit voltage for actuating the interrupter to open the circuit.

4. An interrupter for electric circuits comprising means dependent upon a predetermined relatively quick rate of change in the electricity transmitted through the circuit for forcibly actuating the interrupter to open the circuit.

5. An interrupter for electric circuits that tends to occupy its open position and comprises means for holding it closed and means dependent upon a predetermined relatively quick rate of change in the electrical energy transmitted through the circuit for permitting it to open the circuit.

6. An interrupter for electric circuits comprising means dependent upon a predetermined relatively quick rate of change in the circuit current for actuating the interrupter to open the circuit.

7. The combination with a direct current electric circuit, a source of energy therefor and an interrupter for the circuit, of means dependent upon a relatively quick rate of change in the energy traversing the circuit for actuating the interrupter.

8. An interrupter for an electric circuit comprising relatively movable contact members and means dependent upon the relatively quick rate of electrical change in the circuit for quickly separating the contact members.

9. An interrupter for an electric circuit comprising relatively movable contact members, and means inductively connected to the electric circuit for tripping the interrupter in anticipation of a predetermined relatively quick electrical change in the circuit.

10. An interrupter for an electric circuit comprising relatively movable contact members, and means operatively connected to the electric circuit for tripping the interrupter in anticipation of a predetermined relatively quick electrical change in the circuit.

In testimony whereof, I have hereunto subscribed my name this 19th day of Feb., 1912.

WILLIAM COOPER.

Witnesses:
E. E. ROSE,
B. B. HINES.